(12) United States Patent
Schmatloch et al.

(10) Patent No.: US 10,400,145 B2
(45) Date of Patent: Sep. 3, 2019

(54) LATENT TWO-PART POLYURETHANE ADHESIVES CURED WITH INFRARED RADIATION

(71) Applicant: DOW GLOBAL TECHNOLOGIES LLC, Midland, MI (US)

(72) Inventors: Stefan Schmatloch, Horgen (CH); Joel Kunz, Horgen (CH)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 135 days.

(21) Appl. No.: 15/579,745

(22) PCT Filed: Jun. 14, 2016

(86) PCT No.: PCT/US2016/037451
§ 371 (c)(1),
(2) Date: Dec. 5, 2017

(87) PCT Pub. No.: WO2016/205255
PCT Pub. Date: Dec. 22, 2016

(65) Prior Publication Data
US 2018/0179320 A1  Jun. 28, 2018

Related U.S. Application Data

(60) Provisional application No. 62/316,677, filed on Apr. 1, 2016, provisional application No. 62/316,680, filed (Continued)

(51) Int. Cl.
| | |
|---|---|
| *C08G 18/16* | (2006.01) |
| *C08G 18/32* | (2006.01) |
| *C08G 18/48* | (2006.01) |
| *C08G 18/66* | (2006.01) |
| *C08G 18/20* | (2006.01) |
| *C08G 18/24* | (2006.01) |
| *C08G 18/72* | (2006.01) |
| *C08G 18/73* | (2006.01) |
| *C08G 18/76* | (2006.01) |
| *C08G 18/10* | (2006.01) |
| *C09J 5/06* | (2006.01) |
| *C09J 175/08* | (2006.01) |
| *C09J 11/04* | (2006.01) |
| *C09J 175/04* | (2006.01) |

(Continued)

(52) U.S. Cl.
CPC ............. *C09J 175/08* (2013.01); *B32B 37/12* (2013.01); *C08G 18/165* (2013.01); *C08G 18/2063* (2013.01); *C08G 18/242* (2013.01); *C08G 18/244* (2013.01); *C08G 18/482* (2013.01); *C08G 18/4812* (2013.01); *C08G 18/4837* (2013.01); *C08G 18/5024* (2013.01); *C08G 18/6674* (2013.01); *C08G 18/798* (2013.01); *C08J 3/24* (2013.01); *C08J 3/244* (2013.01); *C08J 3/28* (2013.01); *C09J 5/06* (2013.01); *C09J 11/04* (2013.01); *C09J 175/04* (2013.01); *B32B 7/12* (2013.01); *B32B 2037/1253* (2013.01); *C08J 2375/04* (2013.01); *C08K 3/04* (2013.01); *C08K 3/346* (2013.01); *C08K 3/36* (2013.01); *C08K 9/00* (2013.01); *C09J 2205/31* (2013.01); *C09J 2400/226* (2013.01); *C09J 2475/00* (2013.01)

(58) Field of Classification Search
CPC .............. C08G 18/165; C08G 18/2063; C08G 18/242; C08G 18/244; C08G 18/4812; C08G 18/482; C08G 18/4837; C08G 18/5024; C08G 18/6674; C08G 18/798; C08G 18/485; C08G 18/4833; C08G 18/7671; C08G 18/7664; C08G 18/82; C08G 18/73; C08J 3/24; C08J 3/244; C08J 3/28; C08J 2375/04; C08K 3/04; C08K 3/346; C08K 3/36; C08K 9/00; C09J 5/06; C09J 2205/31; C09J 175/04; C09J 175/08; C09J 11/04; C09J 2400/226; C09J 2475/00; B32B 37/12
See application file for complete search history.

(56) References Cited

U.S. PATENT DOCUMENTS

| | | | |
|---|---|---|---|
| 4,742,113 A | 5/1988 | Gismond et al. | |
| 4,876,308 A | 10/1989 | Melby et al. | |
| 5,143,996 A | 9/1992 | Chung et al. | |
| 5,606,003 A | 2/1997 | Wang et al. | |
| 6,926,949 B1 | 8/2005 | Haelg et al. | |
| 2002/0068808 A1* | 6/2002 | Kometani | C08G 18/0885 528/54 |

(Continued)

FOREIGN PATENT DOCUMENTS

| | | |
|---|---|---|
| EP | 1435366 A1 | 7/2004 |
| WO | 2009/015149 A1 | 1/2009 |

(Continued)

OTHER PUBLICATIONS

International Search Report for Application No. PCT/US2016/037451 dated Aug. 30, 2016.

*Primary Examiner* — Christopher M Rodd
(74) *Attorney, Agent, or Firm* — The Dobrusin Law Firm, P.C.

(57) ABSTRACT

Two-component polyurethane adhesives include a polyol component and a polyisocyanate component. The polyol component includes a polyether polyol and an aliphatic diol chain extender, but is devoid of primary and second amine compounds. The polyisocyanate component includes one or more polyisocyanate compounds. The adhesive contains a mixture of a dialkyltinthioglycolate catalyst and an acid-blocked cyclic amidine catalyst. The tin catalyst is formulated into the polyol component, whereas the cyclic amidine catalyst can be formulated into either the polyol or the polyisocyanate components.

20 Claims, No Drawings

Related U.S. Application Data on Apr. 1, 2016, provisional application No. 62/213,650, filed on Sep. 3, 2015, provisional application No. 62/181,359, filed on Jun. 18, 2015.

(51) Int. Cl.

| | | |
|---|---|---|
| *C08J 3/24* | (2006.01) | |
| *C08J 3/28* | (2006.01) | |
| *B32B 37/12* | (2006.01) | |
| *C08G 18/50* | (2006.01) | |
| *C08G 18/79* | (2006.01) | |
| *C08K 3/04* | (2006.01) | |
| *C08K 3/34* | (2006.01) | |
| *C08K 3/36* | (2006.01) | |
| *C08K 9/00* | (2006.01) | |
| *B32B 7/12* | (2006.01) | |

(56) References Cited

U.S. PATENT DOCUMENTS

| | | |
|---|---|---|
| 2012/0028561 A1 | 2/2012 | Takado |
| 2013/0255880 A1 | 10/2013 | Mahdi et al. |
| 2015/0159064 A1 | 6/2015 | Roock et al. |
| 2015/0203728 A1 | 7/2015 | Burckhardt et al. |
| 2015/0247073 A1 | 9/2015 | Kelch |

FOREIGN PATENT DOCUMENTS

| | | |
|---|---|---|
| WO | 2012/078331 A1 | 6/2012 |
| WO | 2012/158664 A2 | 11/2012 |
| WO | 2014/029787 A1 | 2/2014 |
| WO | 2014/029891 A1 | 2/2014 |
| WO | 2014/040909 A1 | 3/2014 |
| WO | 2014/040916 A1 | 3/2014 |

* cited by examiner

LATENT TWO-PART POLYURETHANE ADHESIVES CURED WITH INFRARED RADIATION

FIELD

This invention relates to latent two-part polyurethane adhesives that rapidly develop adhesive strength when cured by application of infrared radiation.

BACKGROUND

Polyurethanes are a well-known type of adhesive. They contain precursor materials that cure in place to form an adhesive layer. Polyurethane adhesives come in one-part and two-part types. One-part types generally exhibit a moisture cure or a heat-activated cure. Two-part types consist of a resin component that includes one or more polyisocyanate compounds, and a curative component that includes one or more polyols. When the two components mixed, the polyisocyanates and polyols react to form a cured polyurethane adhesive. A polyurethane adhesive can be formulated to cure at room temperature or upon exposure to certain conditions, an example of which is an elevated temperature. As the adhesive cures, it can form a strong adhesive bond to many types of substrates.

Two-part polyurethane adhesives are usually formulated with a small amount of an amine compound that has primary and/or secondary amino groups. Amino groups react very rapidly with isocyanates. This rapid reaction results in a fast initial viscosity increase without gelling the material. The initial increase in viscosity makes the adhesive more resistant to sagging or running off before it can be cured.

The presence of the amine compound tends to shorten open time and to adversely affect storage stability. For those reasons, it is desirable in some cases to eliminate amine compounds from the adhesive composition, while maintaining a suitable open time and thereafter obtaining a fast cure. The "open time" of a two-part adhesive refers to the amount of time after the two components are mixed that the adhesive remains flowable and capable of bonding to a substrate.

One way of obtaining both a long open time and a fast cure is by formulating the adhesive to have a heat-activated cure. Such an adhesive cures slowly at ambient temperature, thereby allowing the adhesive to be applied and the substrates positioned while the adhesive remains flowable. The resulting assembly is then heated to an elevated temperature at which rapid curing takes place.

Heating using conventional curing ovens tends to be slow and expensive, and may not be well-suited for large or complex assemblies. To lower costs and speed the cure, infrared heating methods have been developed. These methods permit the substrate/adhesive assembly to be brought more rapidly to the curing temperature than with convection ovens.

Infrared heating methods can be used to partially cure the adhesive to develop enough initial bond strength to allow the adhered assembly to be handled in downstream manufacturing operations, while allowing full cure to develop later. This approach can speed production processes, as it is not necessary to wait for the adhesive to fully cure before subsequent manufacturing steps can take place.

Infrared heating has a further advantage in that it can be targeted, so only specific locations of the assembly are heated. This allows for spot-curing, i.e., curing only predetermined portions of the adhesive. Strong localized adhesive bonds form where the localized heat is applied. Even though much of the adhesive remains uncured or only partially cured, these localized bonds provide enough strength to the assembly that it can be manipulated. This process saves time, because localized heating can be accomplished more rapidly than curing the entire assembly, and saves energy as only a portion of the assembly needs to be heated. The subsequent full cure can take place at ambient temperature, or if an elevated temperature cure is needed, this full curing step sometimes can be combined with another manufacturing step, such as a paint curing step, to save costs and speed production rates.

What is wanted is a two-component adhesive that demonstrates a prolonged open time at room temperature, but nonetheless is capable of curing even at room temperature. The adhesive preferably develops bond strength rapidly when exposed to infrared heating.

SUMMARY

This invention is in one aspect a two-component polyurethane adhesive composition having a polyol component and an isocyanate component, wherein the polyol component includes:

a) at least 35 weight percent, based on the weight of the polyol component, of one or more polyols having a hydroxyl equivalent weight of 400 to 2000 and a nominal hydroxyl functionality of 2 to 4;

b) 2.5 to 6 equivalents per equivalent of a), of one or more aliphatic diol chain extenders;

c) from 0.05 to 0.15 parts by weight, per 100 parts by weight of component a), of the one or more latent room temperature organometallic catalysts; and d) 0 to 60 weight percent, based on the weight of the polyol component, of at least one particulate filler, the polyol component being devoid of compounds having primary and/or secondary amino groups;

the polyisocyanate component includes:

at least 50% by weight of one or more organic polyisocyanate compounds; and 0 to 50% by weight of at least one particulate filler;

wherein the isocyanate equivalent weight of the polyisocyanate component and the hydroxyl equivalent weight of the polyol component are such that when the polyisocyanate component and the polyol component are mixed at a 1:1 ratio by volume the isocyanate index is 1.1 to 1.8, and further wherein the polyol component or the polyisocyanate component includes an acid-blocked cyclic amidine catalyst, wherein i) when the acid-blocked amidine catalyst is present in the polyol component, it is present in an amount of 0.10 to 0.25 parts by weight per 100 parts by weight component a) and the combined weight of the acid-blocked amidine catalyst and ii) the latent room temperature organometallic catalyst is up to 0.31 parts by weight per 100 parts by weight of component a), and the acid-blocked amidine catalyst is present in an amount of 0.10 to 0.35 parts by weight per 100 parts by weight of the polyisocyanate component when present in the polyisocyanate component. The one or more latent room temperature organometallic catalysts may be one or more dialkyltinthioglycolates.

The invention is also a cured adhesive formed by curing the two-component polyurethane adhesive composition of the invention. The invention is also a method of bonding two substrates, comprising forming a layer of the two-component polyurethane adhesive at a bondline between two substrates, and curing the layer at the bondline to form a cured adhesive bonded to each of the substrates. The adhesive composition adheres strongly to many substrates.

Surprisingly, the adhesive composition exhibits good latency, even in cases in which the adhesive is room-temperature curable. This is a significant advantage, as it permits the adhesive composition to be formulated for an ambient temperature cure if desired. Despite its latency, the adhesive cures well at room temperature, without the need for applied heating (apart from an exothermic temperature rise due to the curing reaction itself).

In a specific embodiment, the invention is a method of bonding two substrates, comprising combining the components of the two-component polyurethane adhesive, forming a layer of the adhesive at a bondline between two substrates to form an assembly, partially curing the adhesive layer at the bondline by applying infrared radiation to the assembly, and, in a subsequent and separate curing step, completing the cure of the adhesive layer. In such an embodiment, the partial curing step can be performed by curing only one or more predetermined, localized portions of the adhesive layer at the bondline by applying infrared radiation only to said one or more predetermined, localized portions of the assembly to produce an adhesive layer having at least partially cured portions and uncured portions, and the uncured portions of the adhesive layer then can be cured in the subsequent and separate curing step.

DETAILED DESCRIPTION

Ingredient a) of the polyol component is a polyether polyol or mixture of polyether polyols. Each such polyether polyol has a hydroxyl equivalent weight of 400 to 2000. The hydroxyl equivalent weight of each polyol in some embodiments is at least 500, at least 800 or at least 1000, and in some embodiments is up to 1800, up to 1500 or up to 1200.

Each such polyether polyol has a nominal hydroxyl functionality of 2 to 4. By "nominal functionality" of a polyether polyol, it is meant the average number of oxyalkylatable hydrogen atoms on the initiator compound that is alkoxylated to form the polyether polyol. The actual functionalities of the polyether polyol(s) may be somewhat lower than the nominal functionality, due to side-reactions that occur during the alkoxylation process. In the case of a mixture of polyether polyols, the number average nominal functionality preferably is 2 to 3.5 and especially 2.5 to 3.5.

The polyether polyol(s) may be selected from homopolymers of propylene oxide and copolymers of 70 to 99% by weight propylene oxide and 1 to 30% by weight ethylene oxide. Such a copolymer of propylene oxide and ethylene oxide is generally preferred if a single polyether polyol is present. If two or more polyether polyols are present, it is preferred that at least one is such a copolymer of propylene oxide and ethylene oxide. In the case of a copolymer, the propylene oxide and ethylene oxide may be randomly copolymerized, block copolymerized, or both.

In some embodiments, 50% or more of the hydroxyl groups of the polyether polyol or mixture of polyether polyols are primary hydroxyl, with the remainder being secondary hydroxyl groups. 70% or more of the hydroxyl groups in the polyether polyol or mixture thereof may be primary hydroxyl.

The polyether polyol(s) (ingredient a)) constitute at least 35 weight percent of the polyol component. In some embodiments, the polyether polyol(s) constitute at least 40 weight percent or at least 50 weight percent of the polyol component, and in some embodiments constitute up to 80 weight percent, up to 65 weight percent or up to 55 weight percent thereof.

Ingredient b) of the polyol component is one or more aliphatic diol chain extenders. The aliphatic diol chain extender(s) each have a hydroxyl equivalent weight of up to 200, preferably up to 100, more preferably up to 75 and still more preferably up to 60, and exactly two aliphatic hydroxyl groups per molecule. Examples of these are monoethylene glycol, diethylene glycol, triethylene glycol, 1,2-propane diol, 1,3-propane diol, 2,3-dimethyl-1,3-propanediol, dipropylene glycol, tripropylene glycol, 1,4-butanediol, 1,6-hexanediol and other linear or branched alkylene diols having up to about 20 carbon atoms. The aliphatic diol chain extender preferably includes monoethylene glycol, 1,4-butanediol or a mixture thereof.

The aliphatic diol chain extender or mixture thereof is present in an amount of 2.5 to 6 equivalents per equivalent of ingredient a) of the polyol component.

The polyol component further contains ingredient c), 0.05 to 0.15 parts by weight, per 100 parts by weight of ingredient a), of at least latent room temperature organometallic catalyst. The alkyl groups may be the same or different, and may be, for example, methyl, ethyl, n-propyl, isopropyl, n-butyl, t-butyl, isobutyl, 2-ethylhexyl, n-octyl or other alkyl group having up to 12 carbon atoms. A preferred amount of this catalyst is 0.06 to 0.12 parts by weight, per 100 parts by weight of ingredient a). These amounts are based on active catalyst, and ignore the mass of solvents or other materials as may be present in a commercially available dialkyltinglycolate catalyst product.

The polyol component is devoid of compounds having primary and/or secondary amino groups. For purposes of this invention, the polyol component is considered as "devoid" of such compounds if it has an amine hydrogen equivalent weight of at least 50,000, preferably at least 100,000. Amine hydrogen equivalent weight can be measured using well-known titration methods.

The polyol component may further include one or more optional components.

The polyol component may contain at least one particulate filler; however, if a filler is present, it constitutes no more than 60 weight percent of the total weight of the polyol component. It preferably constitutes 25 to 60, more preferably 30 to 50, weight percent of the polyol component. The particulate filler is in the form of particles having a size of 50 nm to 100 µm. The fillers may have a particle size (d50) of at least 250 nm, at least 500 nm or at least 1 µm, up to, for example, 50 µm, 25 µm or 10 µm. Particles sizes are conveniently measured using dynamic light scattering methods, or laser diffraction methods for particles having a size below about 100 nm.

The particulate filler is a solid material at room temperature, is not soluble in the other ingredients of the polyol component or in the polyisocyanate component or any ingredient thereof. The filler is a material that does not melt, volatilize or degrade under the conditions of the curing reaction between the polyol and polyisocyanate components. The filler may be, for example, an inorganic filler such as glass, silica, boron oxide, boron nitride, titanium oxide, titanium nitride, fly ash, calcium carbonate, various alumina-silicates including clays such as wollastonite and kaolin, metal particles such as iron, titanium, aluminum, copper, brass, bronze and the like; thermoset polymer particles such as polyurethane, cured particles of an epoxy, phenol-formaldehyde, or cresol-formaldehyde resin, cross-linked polystyrene and the like; thermoplastics such as polystyrene, styrene-acrylonitrile copolymers, polyimide, polyamide-imide, polyether ketone, polyether-ether ketone, polyethyleneimine, poly(p-phenylene sulfide), polyoxymethylene, polycarbonate and the like; and various types of carbon such as activated carbon, graphite, carbon black and the like. In some embodiments, the particulate filler excludes carbon particles. The particles in some embodiments have an aspect ratio of up to 5, preferably up to 2, more preferably up to 1.5.

Some or all of the filler particles can be grafted onto one or more of the polyether polyol(s) that constitute ingredient (a) of the polyol component.

Another optional ingredient is one or more dispersing aids, which wet the surface of the filler particles and help them disperse into the polyether polyol(s). These may also have the effect of reducing viscosity. Among these are, for example, various dispersing agents sold by BYK Chemie under the BYK, DISPERBYK and ANTI-TERRA-U tradenames, and fluorinated surfactants such as FC-4430, FC-4432 and FC-4434 from 3M Corporation. Such dispersing aids may constitute, for example, up to 2 weight percent, preferably up to 1 weight percent, of the polyol component.

Another useful optional ingredient of the polyol component is a desiccant such as fumed silica, hydrophobically modified fumed silica, silica gel, aerogel, various zeolites and molecular sieves, and the like. One or more desiccants may constitute up to 5 weight percent, preferably up to 2 weight percent of the polyol component, and may be absent from the polyol component.

The polyol component may further include one or more additional isocyanate-reactive compounds, different from ingredients a), b) and c) of the polyol component, and which do not contain amine hydrogen atoms. If any such additional isocyanate-reactive compound(s) are present, they preferably constitute no more than 10 percent, more preferably no more than 5 percent and even more preferably no more than 2 percent, of the weight of the polyol component. Examples of such additional isocyanate-reactive compounds include, for example, one or more polyester polyols; one or more polyether polyols containing at least 50 weight percent polymerized ethylene oxide; one or more polyether polyols having a hydroxyl equivalent weight of 100 to 499; and one or more hydroxy-functional crosslinkers having three or more isocyanate-reactive groups per molecule and a hydroxyl equivalent weight of up to 499.

The adhesive of the invention preferably is non-cellular, and for that reason, the polyol component preferably contains no more than 0.5% by weight, more preferably no more than 0.1%, by weight of organic compounds having a boiling temperature of 80° C. or below, and no more than 0.1% by weight, more preferably no more than 0.05% by weight, of water and/or other chemical blowing agents that produce a gas under the conditions of the curing reaction.

The polyol component in some embodiments contains no more than 10 weight percent, more preferably no more than 5 weight percent, and even more preferably no more than 1 weight percent, of a plasticizer such as a phthalate, terephthalate, mellitate, sebacate, maleate or other ester plasticizer, a sulfonamide plasticizer, a phosphate ester plasticizer, or a polyether di(carboxylate) plasticizer. Such a plasticizer most preferably is absent from the polyol component.

The polyisocyanate component contains one or more polyisocyanate compounds. The polyisocyanate preferably is a mixture of one or more isocyanate-terminated prepolymers having at least 2 isocyanate groups per molecule and an isocyanate equivalent weight of 700 to 3500, and one or more low equivalent weight polyisocyanate compounds that have an isocyanate equivalent weight of up to 350 and 2 to 4 isocyanate groups per molecule. When such a mixture is present, the prepolymer may constitute 20 to 65 percent of the weight of the polyisocyanate component. In some embodiments, the prepolymer constitutes 20 to 60 percent, 20 to 50 percent or 25 to 35 percent of the weight of the polyisocyanate component. The low equivalent weight polyisocyanate, when such a mixture is present, may constitute 20 to 50 weight percent of weight of the polyisocyanate component.

The prepolymer may be a reaction product of one or more aromatic diisocyanates having a molecular weight of up to 350 with i) at least one 700 to 3000 molecular weight homopolymer of poly(propylene oxide) having a nominal hydroxyl functionality of 2 to 4, or ii) a mixture of i) with up to 3 parts by weight, per part by weight of i), of a 2000 to 8000 molecular weight polyether polyol which is a copolymer of 70 to 99 weight percent propylene oxide and 1 to 30 weight percent ethylene oxide and has a nominal hydroxyl functionality of 2 to 4.

The poly(propylene oxide) preferably used to make the prepolymer has a molecular weight of 800 to 2000 and more preferably from 800 to 1500, and preferably has a nominal functionality of 2 to 3, especially 2. A copolymer of 70 to 99 weight percent propylene oxide and 1 to 30 weight percent ethylene oxide used to make the prepolymer preferably has a molecular weight of 3000 to 5500 and a nominal functionality of 2 to 3.

The reaction of polyisocyanate and polyol(s) produces prepolymer molecules having a polyether segment that is capped with the polyisocyanate, so the molecules have terminal isocyanate groups. Each prepolymer molecule contains a polyether segment that corresponds to the structure, after removal of hydroxyl groups, of a polyol used in the prepolymer-forming reaction. If a mixture of polyols is used to make the prepolymer, a mixture of prepolymer molecules is formed.

The isocyanate-terminated prepolymer has an isocyanate equivalent weight of 700 to 3500, more preferably 700 to 3000 and even more preferably 1000 to 3000. The equivalent weight for purposes of this invention is calculated by adding the weight of the polyol(s) used to prepare the prepolymer and the weight of polyisocyanate(s) consumed in reaction with the polyol(s), and dividing by the number of moles of isocyanate groups in the resulting prepolymer.

The polyisocyanate used to make the prepolymer can be any of the low equivalent weight polyisocyanate compounds mentioned below, or a mixture of two or more of these. The prepolymer has at least 2, preferably 2 to 4, especially 2 to 3, isocyanate groups per molecule. The isocyanate groups of the prepolymer may be aromatic, aliphatic (including alicyclic), or a mixture of aromatic and aliphatic isocyanate groups. The isocyanate groups on the prepolymer molecules preferably are aromatic.

The low equivalent weight polyisocyanate compound(s) in some embodiments have an isocyanate equivalent weight of 80 to 250, 80 to 200, or 80 to 180. If a mixture of polyisocyanate compounds is present, the mixture may have, for example, an average of 2 to 4 or 2.3 to 3.5 isocyanate groups per molecule.

All or a portion of the low equivalent weight polyisocyanate compound may have aromatic isocyanate groups. Among the useful aromatic polyisocyanate compounds m-phenylene diisocyanate, toluene-2,4-diisocyanate, toluene-2,6-di-isocyanate, naphthylene-1,5-diisocyanate, methoxyphenyl-2,4-diisocyanate, diphenyl-methane-4,4'- diisocyanate, diphenylmethane-2,4'-diisocyanate, 4,4'-biphenylene diisocyanate, 3,3'-dimethoxy-4,4'-biphenyl diisocyanate, 3,3'-dimethyl-4-4'-biphenyl diisocyanate, 3,3'-dimethyldiphenyl methane-4,4'-diisocyanate, 4,4',4"-triphenyl methane triisocyanate, polymethylene polyphenylisocyanate (PMDI), toluene-2,4,6-triisocyanate and 4,4'-dimethyldiphenylmethane-2,2',5,5'-tetraisocyanate. Modified aromatic polyisocyanates that contain urethane, urea, biuret, carbodiimide, uretoneimine, allophonate or other groups formed by reaction of an isocyanate groups are also useful. A preferred aromatic polyisocyanate is MDI or PMDI (or a mixture thereof that is commonly referred to as "polymeric MDI"), and so-called "liquid MDI" products that are mixtures of MDI and MDI derivatives that have biuret, carbodiimide, uretoneimine and/or allophonate linkages.

All or a portion of the low equivalent weight polyisocyanate compounds may be one or more aliphatic polyisocyanates. Examples of these include cyclohexane diisocyanate, 1,3- and/or 1,4-bis(isocyanatomethyl)cyclohexane, 1-methyl-cyclohexane-2,4-diisocyanate, 1-methyl-cyclohexane-2,6-diisocyanate, methylene dicyclohexane diisocyanate, isophorone diisocyanate and hexamethylene diisocyanate.

It is preferred that at least some of the polyisocyanate groups present in the polyisocyanate component are aromatic isocyanate groups. If a mixture of aromatic and aliphatic isocyanate groups is present, it is preferred that at least 50% by number, more preferably at least 75% by number, are aromatic isocyanate groups. In some preferred embodiments, 80 to 98% by number of the isocyanate groups are aromatic, and 2 to 20% by number are aliphatic. It is especially preferred that the isocyanate groups of the prepolymer are aromatic, and the isocyanate groups of the polyisocyanate compound(s) having an isocyanate equivalent weight of up to 350 are a mixture of 80 to 95% aromatic isocyanate groups and 5 to 20% aliphatic isocyanate groups.

It is often convenient to prepare a prepolymer by combining the polyol or polyol mixture with an amount of low equivalent weight polyisocyanate compound(s) significantly greater than needed to simply cap the polyol(s). After reaction, this produces a mixture of the prepolymer and unreacted low equivalent weight polyisocyanate compounds. If desired, an additional amount of polyisocyanate compound(s) can then be blended into this mixture. In certain embodiments, the polyol(s) are combined and reacted with an excess of one or more aromatic polyisocyanates to produce a mixture of prepolymer and unreacted starting polyisocyanate compounds, and this mixture then is combined with one or more aliphatic polyisocyanates.

In an especially preferred embodiment, the prepolymer is made in a reaction of the polyol(s) with MDI, PMDI, a polymeric MDI, a derivative of any one or more of these that contains biuret, carbodiimide, uretoneimine and/or allophonate, or a mixture of any two or more of these, to produce a mixture of prepolymer and unreacted starting polyisocyanates, and the mixture is then combined with one or more aliphatic polyisocyanates, especially an aliphatic polyisocyanate based on hexamethylene diisocyanate.

The polyisocyanate component may contain up to 50% by weight of one or more particulate inorganic fillers as described before. In some embodiments, the polyisocyanate component contains at least 20% by weight of one or more such fillers, and may contain, for example, 20 to 50% or 30 to 40% by weight thereof. As before, in some embodiments, the filler excludes carbon particles.

The polyisocyanate component may also contain one or more other additional ingredients, such as those described above with respect to the polyisocyanate compound. As with the polyol component, the polyisocyanate component preferably contains no more than 0.5% by weight, more preferably no more than 0.1%, by weight of organic compounds having a boiling temperature of 80° C. or less, and no more than 0.1% by weight, more preferably no more than 0.05% by weight, of water and/or other chemical blowing agents that produce a gas under the conditions of the curing reaction. The polyisocyanate compound preferably contains at most, amounts of plasticizers as described before with respect to the polyol component. The isocyanate component may be devoid of a plasticizer.

The two-part adhesive of the invention contains an acid-blocked cyclic amidine catalyst. A preferred amidine catalyst is 1,8-diazabicycloundec-7-ene (DBU) or 1,5-Diazabicyclo[4.3.0]non-5-ene (DBN) and the like. The acid blocking agent is preferably a phenolic compound such as phenol itself or a substituted phenol, and/or an aliphatic carboxylic acid having 1 to 24 carbon atoms, especially 1 to 8 carbon atoms. The acid-blocked cyclic amidine catalyst can be incorporated into either the polyol component or the polyisocyanate component.

When the acid-blocked amidine catalyst is present in the polyol component, it is present in an amount of 0.10 to 0.25, preferably 0.10 to 0.22, parts by weight per 100 parts by weight component a). In such embodiments, the combined weight of the acid-blocked amidine catalyst and the latent room temperature organometallic catalyst preferably is up to 0.31 parts by weight per 100 parts by weight of component a).

If present in the polyisocyanate component, the acid-blocked amidine catalyst is present in an amount of 0.10 to 0.35 parts by weight, preferably 0.10 to 0.25 parts by weight, per 100 parts by weight of the polyisocyanate component. The weight of the acid-blocked cyclic amidine catalyst is based on weight of blocked active catalyst, and ignores the mass of solvents or other materials as may be present in a commercially available acid-blocked cyclic amidine catalyst product.

It is generally preferred that the latent room temperature organometallic catalyst, such as dialkyltinthioglycolate, and acid-blocked cyclic amide catalysts are the only catalysts for the reaction of a hydroxyl group with an isocyanate group present in the two-part adhesive.

The polyol component and polyisocyanate component are formulated such that when equal volumes of the components are provided, the isocyanate index is 1.1 to 1.8. For purposes of this invention, "isocyanate index" is the ratio of the number of isocyanate groups in the polyisocyanate component to the number of isocyanate-reactive groups in the polyol component. A preferred isocyanate index, at a 1:1 volume ratio, is 1.15 to 1.65.

A latent room temperature organometallic catalysts is a catalyst that functions to catalyze the reaction of the nucleophiles (polyols, polyamines) present in the polyol component with the isocyanates present in the isocyanate component. The latent organometallic catalyst may show delayed action. The latent room temperature catalysts may exhibit accelerated catalytic activity when exposed to temperatures at a temperature of 40° C. or greater. Any latent room temperature organometallic catalysts which provides good open time, acceptable initial lap shear strengths and which maintains an acceptable level of reactivity after partial curing and storage may be utilized. Exemplary classes of latent room temperature organometallic catalysts contain tin, zinc or bismuth. Exemplary latent room temperature organometallic catalysts include zinc alkanoates, bismuth alkanoates, dialkyltin alkanoates, dialkyl tin mercaptides, dialkyl tin bis(alkylmercaptoacetates), dialkyltin thioglycolates or mixtures thereof. Exemplary latent room temperature organometallic catalysts include zinc neoalkanoates, bismuth neo-alkanoates, dialkyltin neoalkanoates, dialkyl tin mercaptides, dialkyl tin bis(alkylmercapto acetates), dialkyltin thioglycolates or mixtures thereof. The latent room temperature organometallic catalysts may be dialkyl tin mercaptides, dialkyl tin bis(alkylmercapto-acetates), dialkyltin thioglycolates or mixtures thereof. The latent room temperature organometallic catalysts may be dialkyltin thioglycolates or mixtures thereof. The alkyl groups on the latent room temperature organometallic catalysts may be any alkyl groups of about 1 or more carbon atoms or 4 or greater carbon atoms. The alkyl groups on the latent room temperature organometallic catalysts may be any alkyl groups of about 20 or less carbon atoms or 12 or less carbon atoms. Exemplary alkyls groups include methyl, butyl, octyl and dodecyl groups. The latent room temperature organometallic catalysts may be present in an amount sufficient to provide good open time, acceptable initial lap shear strengths and which maintains an acceptable level of reactivity after partial curing and storage.

The invention is also a process for bonding two substrates. In general, the polyol component and the isocyanate component are mixed to form the mixed adhesive. The ratio of these materials is generally sufficient to provide an isocyanate index of 1.1 to 1.8, more preferably 1.15 to 1.65. The mixed adhesive is formed into an adhesive layer between and in contact with the two substrates. An adhesion promoter may be applied to one or both of the substrates prior to contacting the substrate(s) with the adhesive. The adhesive layer is then cured between and in contact with the two substrates to form a layer of cured adhesive bonded to each of the two substrates.

The methods used to mix the isocyanate component with the polyol component, form the adhesive layer and cure the adhesive are, broadly speaking, not critical and a variety of apparatus can be used to perform these steps. Thus, the isocyanate component and polyol component can be mixed and applied to the substrates manually, in various types of batch apparatus, and/or using various sorts of automated metering, mixing and dispensing equipment.

The polyol component and isocyanate component often will react spontaneously upon mixing at room temperature (about 22° C.) and cure without the need to heat the adhesive to a greater temperature. Therefore, in some embodiments, curing is effected by simply mixing the components at a temperature of, for example, 0 to 35° C. and allowing the components to react at that temperature. At approximately room temperature, the two-part adhesive typically exhibits an open time of at least 5 minutes, more preferably at least 10 minutes and even more preferably 10 to 15 minutes, measured as described in the following examples.

Heating can be applied to the adhesive to obtain a more rapid cure. The polyol and isocyanate components can be heated separately and then mixed and cured, with or without further applied heat. Alternatively, the polyol and isocyanate components can be mixed at a lower temperature, such as 0 to 35° C. and then heated to a higher cure temperature. The substrate can be heated before applying the adhesive if desired. If an elevated temperature is used in the curing step, such a temperature may be, for example, 36 to 150° C., or 50 to 130° C.

In specific embodiments, a layer of the two-component polyurethane adhesive is formed at a bondline between two substrates to form an assembly. The adhesive layer is then at least partially cured at the bondline by applying infrared radiation to the assembly. Infrared radiation may be applied, for example, until the temperature of the adhesive layer reaches 80 to 150° C., preferably 90 to 130° C. The assembly so heated may be maintained under infrared radiation until the adhesive layer has been exposed to such temperatures for a period of 5 seconds or more to effect the partial or complete cure. For example, the infrared radiation may be continued until the temperature of adhesive layer is 80 to 150° C., preferably 90 to 130° C., for 5 to 60 seconds, 5 to 45 seconds, for 10 to 30 seconds or for 10 to 20 seconds, at which time the exposure to infrared radiation is discontinued.

If only a partial cure is performed by applying infrared radiation, the partial curing can be either or both of two types. In one type of partial curing, the entire adhesive layer is cured, but only partially. Such partial curing preferably is at least to the gel point, at which a three-dimensional polymeric network is formed in the adhesive layer by the curing of the components. In another type of partial curing, only one or more predetermined, localized portions of the adhesive layer at the bondline are cured. This produces an adhesive layer having at least partially cured portions and portions that have undergone little or no cure. The predetermined, localized portions of the adhesive layer may constitute, for example, 5 to 80%, 5 to 50% or 5 to 25% of the total area of the adhesive layer. Subsequent to the partial curing step, the uncured or only partially cured portions of the adhesive layer then are cured further to form a fully-cured adhesive. The subsequent step of completing the cure can be done approximately room temperature (such as from 15 to 35° C.) or an elevated temperature such as greater than 35° C. to 80° C.

A two-step curing process as just described is useful in a variety of manufacturing, building and construction, and in-field assembly and repair applications. By performing only a partial cure by applying infrared radiation, a rapid bonding of the adhesive to the substrate can be obtained in a very short time, often a matter of 10 seconds to 2 minutes. This initial bond is often robust enough that the assembly can withstand further handling. Further handing may include, for example, transporting the assembly to a downstream work station, and further manufacturing steps which might include joining the assembly to one or more other components, various shaping and/or machining steps, the application of a coating, and the like. The completion of the cure can take place during and/or after such additional handling steps. Often, the adhesive will fully cure without exposing it to elevated temperature, infrared radiation or other energy source, due at least in part to the catalytic action of the latent room temperature organometallic catalyst. It is believed that the acid-blocked cyclic amidine catalyst de-blocks during the infrared heating stage, to produce an active catalyst that also promotes the cure during the subsequent curing step, even if that subsequent step is performed without additional applied energy.

The substrates are not limited. They can be, for example, a metal, a metal alloy, an organic polymer, a lignocellulosic material such as wood, cardboard or paper, a ceramic material, various types of composites, or other materials. Carbon fiber reinforced plastic is a substrate of particular interest. The substrates in some embodiments are vehicular parts or vehicular sub-assemblies that are adhered together with a cured adhesive composition of the invention. The substrates in other embodiments are individual plies that are glued together using the adhesive of the invention to form a multilayer laminate. The substrates in other embodiments are building members.

ILLUSTRATIVE EMBODIMENTS

The following examples are provided to illustrate the invention, but are not intended to limit the scope thereof. All parts and percentages are by weight unless otherwise indicated. In the following examples:

Polyol A is a nominally trifunctional ethylene oxide-capped poly(propylene oxide) having a molecular weight of about 4800 g/mol and a hydroxyl equivalent weight of about 1600.

The Aminated Polyether is a 400 g/mol, difunctional poly(propylene oxide) terminated in primary amine groups, sold as Jeffamine™ D-400 by Huntsman Corporation.

The Aliphatic Polyisocyanate is a commercially available product based on hexamethylene diisocyanate, having an isocyanate equivalent weight of 193.

The Liquid MDI is a commercially available modified MDI product (Desmodur™ N3400 from Bayer Material Sciences) having an isocyanate functionality of about 2.2 and equivalent weight of about 143.

The Prepolymer is made by combining Polyol A (17.74 parts), a nominally difunctional poly(propylene oxide) having a molecular weight of about 2000 and a hydroxyl equivalent weight of about 1000 (12.09 parts), the "liquid MDI" product (27.5 parts), and a plasticizer (18.07 parts) and heating the resulting mixture to a constant isocyanate content, to form a plasticized prepolymer. The plasticized prepolymer is then blended with a pure MDI product containing mostly the 4,4'-isomer and having an isocyanate equivalent weight of about 125 (5.08 parts) and carbon black (19 parts).

Catalyst A is a commercially available dialkyltinthioglycolate catalyst. It contains essentially 100% active material.

Catalyst B is a commercially available phenol-blocked 1,8-diazabicycloundec-7-ene catalyst that contains about 50% by weight active material.

Catalyst C is a commercially available 2,4,6-tri(dimethylaminomethyl) phenol catalyst.

Catalyst D is a commercially available dioctyl tin dicarboxylate catalyst in which the carboxylate groups are mainly laurate. It contains essentially 100% active catalyst.

Examples 1-6 and Comparative Samples A and B

Polyol Components and Polyisocyanate Components for each of Examples 1-6 and Comparative Samples A and B are made by blending ingredients as indicated in Table 1. In each case, the polyol and polyisocyanate components are separately packaged into cartridges.

TABLE 1

| Ingredient | Designation | | | | | | | |
|---|---|---|---|---|---|---|---|---|
| | C-A* | C-B* | 1 | 2 | 3 | 4 | 5 | 6 |
| | Parts by Weight | | | | | | | |
| POLYOL COMPONENT | | | | | | | | |
| Polyol A | 48.1 | 48.9 | 48.9 | 48.9 | 48.9 | 48.9 | 48.9 | 48.9 |
| Aminated Polyether | 0.6 | 0 | 0 | 0 | 0 | 0 | 0 | 0 |
| 1,4-butanediol (equivalents/equivalent Polyol A) | 4.8 | 5 | 5 | 5 | 5 | 5 | 5 | 5 |
| Catalyst A | 0 | 0 | 0.03 | 0.03 | 0.045 | 0.04 | 0.04 | 0.04 |
| Catalyst B | 0.05 | 0.2 | 0.1 | 0.2 | 0.11 | 0 | 0 | 0 |
| Catalyst C | 0.07 | 0 | 0 | 0 | 0 | 0 | 0 | 0 |
| Catalyst D | 0.05 | 0 | 0 | 0 | 0 | 0 | 0 | 0 |
| Calcined China Clay | 44.8 | 44.3 | 44.4 | 44.3 | 44.4 | 44.4 | 44.4 | 44.4 |
| Hydrophobically Modified Fumed Silica | 1.5 | 1.5 | 1.5 | 1.5 | 1.5 | 1.5 | 1.5 | 1.5 |
| Molecular Sieves | 0.9 | 0.9 | 0.9 | 0.9 | 0.9 | 0.9 | 0.9 | 0.9 |
| ISOCYANATE COMPONENT | | | | | | | | |
| Prepolymer | 52 | 52 | 52 | 52 | 52 | 51.8 | 51.9 | 51.9 |
| Liquid MDI | 24 | 24 | 24 | 24 | 24 | 24 | 24 | 24 |
| Aliphatic Polyisocyanate | 5 | 5 | 5 | 5 | 5 | 5 | 5 | 5 |
| Carbon Black | 19 | 19 | 19 | 19 | 19 | 18.8 | 18.9 | 18.9 |
| Catalyst A | 0 | 0.045 | 0 | 0 | 0 | 0 | 0 | 0 |
| Catalyst B | 0 | 0 | 0 | 0 | 0 | 0.5 | 0.3 | 0.2 |

*Not an example of the invention.

Open time is evaluated for each of Adhesive Examples 1-6 and Comparative Samples A and B by dispensing the corresponding polyol and polyisocyanate components in a 1:1 by weight ratio, using Kröger TS 400 double cartridge application gun with a mounted static mixer unit, at an application pressure of at least 6 bar (606 kPa). Open time is measured by extruding an 8 to 10 mm diameter bead of the adhesive onto a polyethylene film, and compressing the bead periodically with a wooden spatula until the adhesive no longer sticks to the wooden surface.

Samples for room temperature and 180 second IR cured lap shear strength measurements are prepared by forming a layer of the adhesive between two 100×45×2.2 mm cleaned carbon fiber reinforced plastic samples (Voraforce™ 5300, from The Dow Chemical Company), that overlap to form a bond area of 10×25 mm. The adhesive layer is 1.5 mm thick. The samples are manually ground with a 320 grinding pad prior to testing, until a uniform visual appearance is achieved. The adhesive is applied and the test samples assembled at room temperature.

In each case, multiple test specimens are prepared. Duplicate samples are evaluated for lap shear strength after one hour curing at 23° C. and 50% relative humidity (RT cure)

and separately after a 180 second IR cure. In the 180 second IR cure, the test specimen is placed in IR curing equipment and exposed to an IR source for 180 seconds such that the temperature of the adhesive increases, reaching 100-110° C. for the final 10-20 seconds of the heating process. Lap shear strength is measured on the samples according to DIN EN 527 using a Zwick 1435 testing device equipped with a FHM 8606.00.00 or 8606.04.00 mounting device, beginning 5 to 10 seconds after the IR heating step is completed. Results are as indicated in Table 2. Comparative Sample C-B is not evaluated due to its unacceptably high reactivity.

Adhesive Example 3 is additionally evaluated in the same manner on e-coated aluminum substrates. In that case an IR cure is performed in the same general manner just described, except the exposure time is only 50 seconds. Because of the greater thermal conductivity of the aluminum substrates, this is sufficient time for the adhesive to attain a temperature of about 120 to 130° C. during the last 20 seconds of the curing step. Results are again indicated in Table 2.

TABLE 2

| Designation | Polyol Component Catalyst(s) | Polyisocyanate Component Catalyst(s) | Open Time, s | Lap Shear Strength, MPa | | |
|---|---|---|---|---|---|---|
| | | | | RT Cure | 180-sec IR cure | 50-sec IR cure |
| C-A* | B, C, D | None | 410 | 0.88 | 1.44 | N.D. |
| C-B* | B | A | 200 | N.D. | N.D. | N.D. |
| Ex. 1 | A, B | None | 620 | 0.41 | 1.25 | N.D. |
| Ex. 2 | A, B | None | 600 | 0.35 | 2.2 | N.D. |
| Ex. 3 | A, B | None | 606 | 0.5 | 2.2 | 3.2 |
| Ex. 4 | A | B | 725 | 0.54 | 2.1 | N.D. |
| Ex. 5 | A | B | 680 | 0.55 | 2.0 | N.D. |
| Ex. 6 | A | B | 720 | 0.48 | 1.5 | N.D. |

*Not an example of the invention.
N.D. means not determined.

Comparative Sample A is representative of a conventional two-part polyurethane adhesive. It contains an aliphatic diamine as an anti-sag ingredient. The open time is undesirably short (410 seconds).

Examples 1-3 all omit the aliphatic diamine component of Comparative Sample A. In these examples, both the dialkyltinthioglycolate catalyst and acid-blocked amidine catalyst are formulated into the polyol side. Open times are increased to 560 to over 600 seconds. Despite this, room temperature curing takes place, as indicated by the RT cure lap shear strengths. Upon 180 second IR curing, these materials cure rapidly and develop substantial lap shear strength. In particular Examples 2 and 3 demonstrate substantially higher lap shear strength after 180 second IR curing than the control (Comparative Sample C-A), despite the absence of the highly reactive aliphatic diamine.

Examples 4-6 show that good results are achieved even when the acid-blocked amidine catalyst is shifted to the polyisocyanate component. Doing so leads to another significant increase in open time (to 680-725 seconds, vs. up to 620 seconds for Examples 1-3), while retaining equivalent or better lap shear strengths as Examples 1-3 (and Comparative Sample C-A). Additionally, Examples 4 and 5 show that these good results can be achieved despite the present of rather high levels of the acid-blocked amidine catalyst. Shifting this catalyst to the polyisocyanate component is therefore seen to improve open time while maintaining equivalent or better curing properties, and at the same time reducing sensitivity to catalyst levels.

Comparative Sample C-B shows the effect of putting the tin catalyst into the polyisocyanate component. This leads to a large and unacceptable decrease in open time. Taken with Examples 1-6, Comparative Sample C-B demonstrates the unexpected effect of how the catalysts are formulated into the adhesive composition.

What is claimed is:

1. A two-component polyurethane adhesive composition having a polyol component and an isocyanate component, wherein:
   the polyol component includes:
   a) at least 35 weight percent, based on the weight of the polyol component, of one or more polyols having a hydroxyl equivalent weight of 400 to 2000 and a nominal hydroxyl functionality of 2 to 4;
   b) 2.5 to 6 equivalents, per equivalent of a), of one or more aliphatic diol chain extenders;
   c) from 0.05 to 0.15 part by weight, per 100 parts by weight of component a), of one or more one or more latent room temperature organometallic catalysts; and
   d) 0 to 60 weight percent, based on the weight of the polyol component, of at least one particulate filler, the polyol component being devoid of compounds having primary and/or secondary amino groups;
   the polyisocyanate component includes:
   at least 50% by weight of one or more organic polyisocyanate compounds; and
   0 to 50% by weight of at least one particulate filler;
   wherein the isocyanate equivalent weight of the polyisocyanate component and the hydroxyl equivalent weight of the polyol component are such that when the polyisocyanate component and the polyol component are mixed at a 1:1 ratio by volume the isocyanate index is 1.1 to 1.8, and further wherein the polyol component or the polyisocyanate component includes an acid-blocked cyclic amidine catalyst, wherein when the acid-blocked amidine catalyst is present in the polyol component, it is present in an amount of 0.10 to 0.25 parts by weight per 100 parts by weight component a) and the combined weight of the acid-blocked amidine catalyst and the one or more latent room temperature organometallic catalysts is up to 0.31 parts by weight per 100 parts by weight of component a), and the acid-blocked amidine catalyst is present in an amount of 0.10 to 0.35 parts by weight per 100 parts by weight of the polyisocyanate component when present in the polyisocyanate component.

2. The two-component polyurethane adhesive composition of claim 1, wherein the polyol component contains 0.06 to 0.12 part by weight of the one or more latent room temperature organometallic catalysts per 100 parts by weight of component a).

3. The two-component polyurethane adhesive composition of claim 1, wherein the acid-blocked amidine catalyst is in the polyol component, and is present in an amount of 0.10 to 0.22 part by weight per 100 parts by weight of component a).

4. The two-component polyurethane adhesive composition of claim 1, wherein the acid-blocked amidine catalyst is in the polyisocyanate component, and is present in an amount of 0.10 to 0.25 part by weight per 100 parts by weight of component a).

5. The two-component polyurethane adhesive composition of claim 1, wherein the acid-blocked amidine catalyst is an acid-blocked 1,8-diazabicycloundec-7-ene or 1,5-Diazabicyclo[4.3.0]non-5-ene.

6. The two-component polyurethane adhesive composition of claim 5 wherein the acid-blocked amidine catalyst is blocked with phenol, a substituted phenol, an aliphatic carboxylic acid having 1 to 24 carbon atoms or a mixture of two or more thereof.

7. The two-component polyurethane adhesive composition of claim 1 wherein the particulate filler constitutes 25 to 60% of the weight of the polyol component.

8. The two-component polyurethane adhesive composition of claim 1 wherein the particulate filler constitutes 20 to 50% of the weight of the polyisocyanate component.

9. The two-component polyurethane adhesive composition of claim 1 wherein the polyisocyanate component includes both aliphatic and aromatic isocyanates.

10. The composition according to claim 1 wherein the one or more latent room temperature organometallic catalysts contain tin, zinc or bismuth.

11. The composition according to claim 1 wherein the one or more latent room temperature organometallic catalysts are zinc alkanoates, bismuth alkanoates, dialkyltin alkanoates, dialkyl tin mercaptides, dialkyl tin bis(alkylmercaptoacetates), dialkyltin thioglycolates or mixtures thereof.

12. A composition according to claim 1 wherein the one or more latent room temperature organometallic catalysts are dialkyl tin mercaptides, dialkyl tin bis(alkylmercaptoacetates), dialkyltin thioglycolates or mixtures thereof.

13. A composition according to claim 1 wherein the one or more latent room temperature organometallic catalysts are dialkyltin thioglycolates.

14. A cured adhesive formed by mixing the components of the two-component polyurethane adhesive composition of claim 1 to form an adhesive mixture, and curing the mixed adhesive.

15. A method of bonding two substrates, comprising combining the components of the two-component polyurethane adhesive of claim 1 to form an adhesive mixture, forming a layer of the adhesive mixture at a bondline between two substrates to form an assembly, and curing the layer at the bondline to form a cured adhesive bonded to each of the substrates.

16. The method of claim 15 wherein the curing step is at least partially performed by applying infrared radiation to the assembly.

17. The method of claim 16, wherein the curing is performed by partially curing the adhesive layer at the bondline by applying infrared radiation to the assembly and, in a subsequent and separate curing step, completing the cure of the adhesive layer.

18. The method of claim 15 wherein the acid-blocked amidine catalyst is in the polyisocyanate component, and is present in an amount of 0.10 to 0.25 part by weight per 100 parts by weight of component a).

19. A composition according to claim 1 wherein the aliphatic diol chain extender(s) each have a hydroxyl equivalent weight of up to 100.

20. A composition according to claim 1 wherein the aliphatic diol chain extender(s) includes monoethylene glycol, 1,4-butanediol or a mixture thereof.

* * * * *